Figure 1:
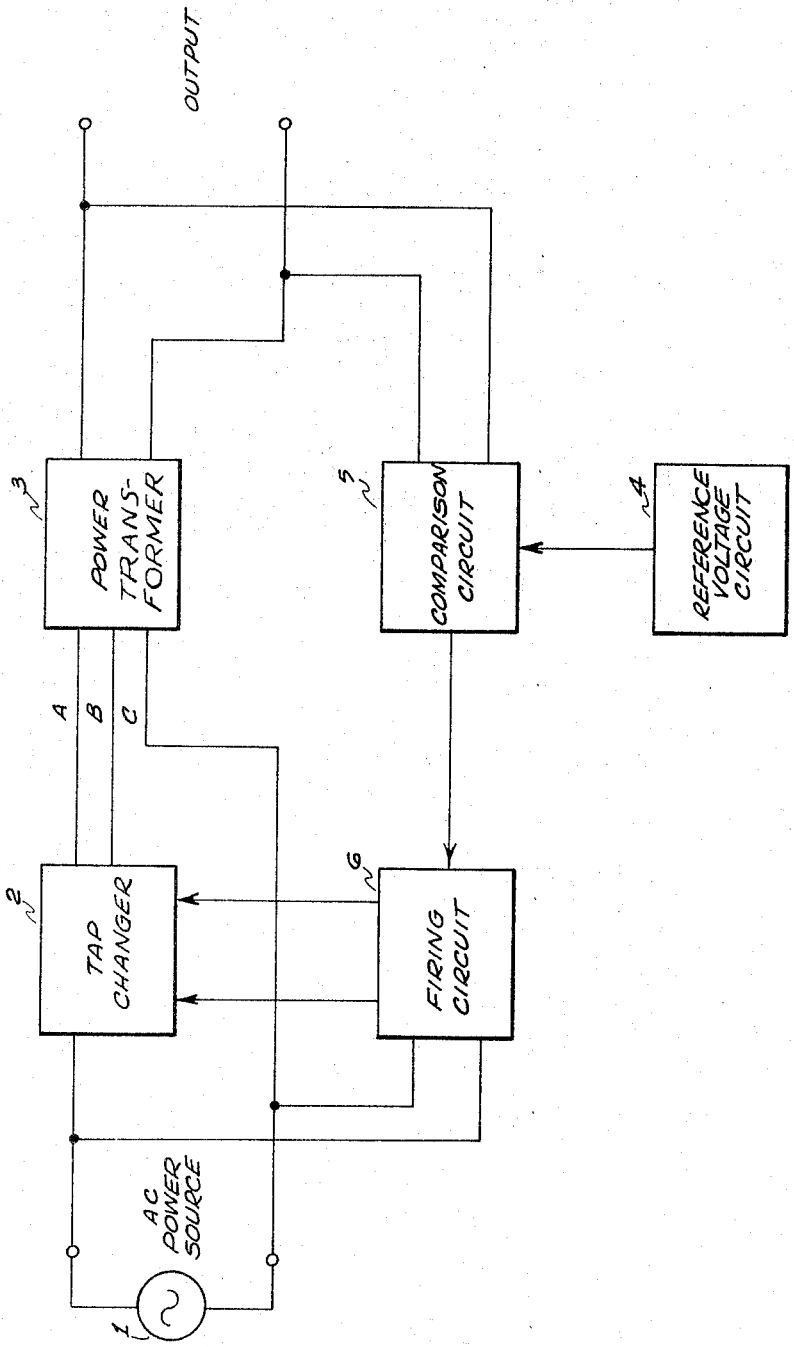

May 9, 1967

O. W. LIVINGSTON 3,319,153

AUTOMATIC VOLTAGE CONTROL CIRCUIT
EMPLOYING ELECTRONIC TAP CHARGER

Filed March 16, 1964

3 Sheets-Sheet 2

INVENTOR.
ORRIN W. LIVINGSTON
BY Melvin M. Goldenberg
HIS ATTORNEY

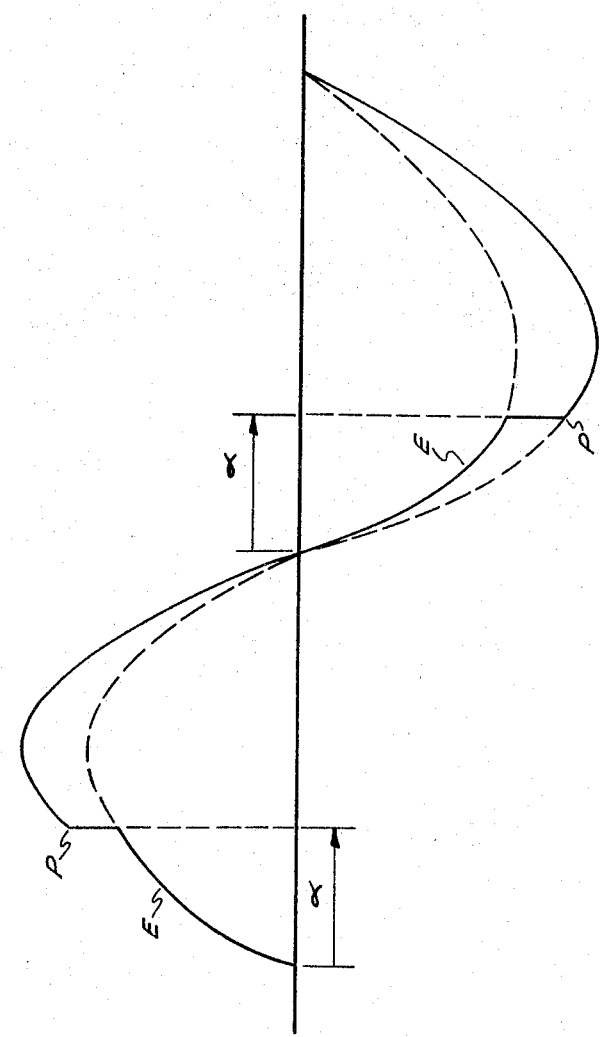

United States Patent Office 3,319,153
Patented May 9, 1967

3,319,153
AUTOMATIC VOLTAGE CONTROL CIRCUIT EMPLOYING ELECTRONIC TAP CHANGER
Orrin W. Livingston, Waynesboro, Va., assignor to General Electric Company, a corporation of New York
Filed Mar. 16, 1964, Ser. No. 351,990
6 Claims. (Cl. 323—43.5)

The present invention relates to A.C. voltage regulation. More particularly, it relates to a simple and improved arrangement for regulating A.C. power.

Heretofore, a widely used technique for regulating A.C. power has been the monitoring and adjustment of a power transformer voltage to compensate for variations in the A.C. source voltage and load conditions. One technique for accomplishing such transformer voltage control has been the mechanical switching of one of the A.C. source lines between taps on one of the power transformer windings whereby the ratio of its primary and secondary windings turns is varied in accordance with the degree of adjustment desired. The mechanical switching devices used in the above techniques, in order to effect switching between taps without interrupting the load are, of necessity, complicated by the requirement of the inclusion of means for making a next contact with a selected tap before breaking contact with a presently contacted tap, while concurrently avoiding the short-circuiting of any two of the taps. Such means to accomplish these switching functions present many disadvantages in that they are complicated, change the voltage in steps rather than smoothly, and are manually rather than automatically operated and, hence, have a slow response.

Accordingly, it is an object of the invention to provide an automatic voltage regulating circuit employing electronic devices to achieve static switching between taps on one of the power transformer windings, having a fast response to changes in the A.C. source voltage and load conditions, and which is substantially unaffected by vibration and shock.

It is another object of the invention to provide a novel automatic voltage regulating circuit utilizing static switching in which the changes in voltage are effected in a continuously smooth manner rather than in steps and which does not require complicated electromechanical devices.

Other known techniques employ apparatus wherein the full transformer current passes through electronic discharge devices in a control circuit to enable such current to be transferred between the various device paths at a point in each half cycle of A.C. source potential depending upon load conditions. These techniques present disadvantages in that such current passing through the control circuit requires that the electronic discharge devices be of sufficiently high current rating to permit them to handle the full primary current. The current ratings of typical electronic discharge devices employed in such control circuits impose a severe limitation on the magnitude of the transformer current that may thereby be handled. Moreover, these control circuit techniques are inefficient since a substantial percentage of the total power output controlled is necessarily dissipated in the control circuit.

Therefore, it is a further object of this invention to provide an improved automatic voltage control circuit which employs electronic control means isolated from the power circuit to vary the effective turns ratio of the primary and secondary windings of the power transformer at a point in each half cycle of A.C. source voltage depending upon the instantaneous amplitude of the source voltage and load conditions.

Briefly stated and in accordance with the invention, in one embodiment thereof, each primary winding of a pair of transformers is respectively connected at one end to one terminal of an A.C. voltage source and at its other end to either an end point or an intermediate point respectively on a winding of a power transformer. Each of the aforesaid primary windings has associated therewith means responsive to the application of a voltage thereto for effectively connecting the A.C. source to an end point and to an intermediate point on the power transformer winding. With this arrangement, the connecting means effectively connects the A.C. source terminal to one of the power transformer winding points at the beginning of the half cycle of output voltage and thereafter switches this connection to the other of the points at an instant in the said half cycle. A voltage representing the deviation of the power transformer output voltage from a selected value, is applied to the connecting means to determine the instant in the half cycle at which switching occurs.

The novel features of the invention are set forth with particularity in the appended claims. The invention itself, however, both as to its organization and method of operation, together with further objects and advantages thereof, may be best understood by referring to the following description and the accompanying drawings.

Figure 2:
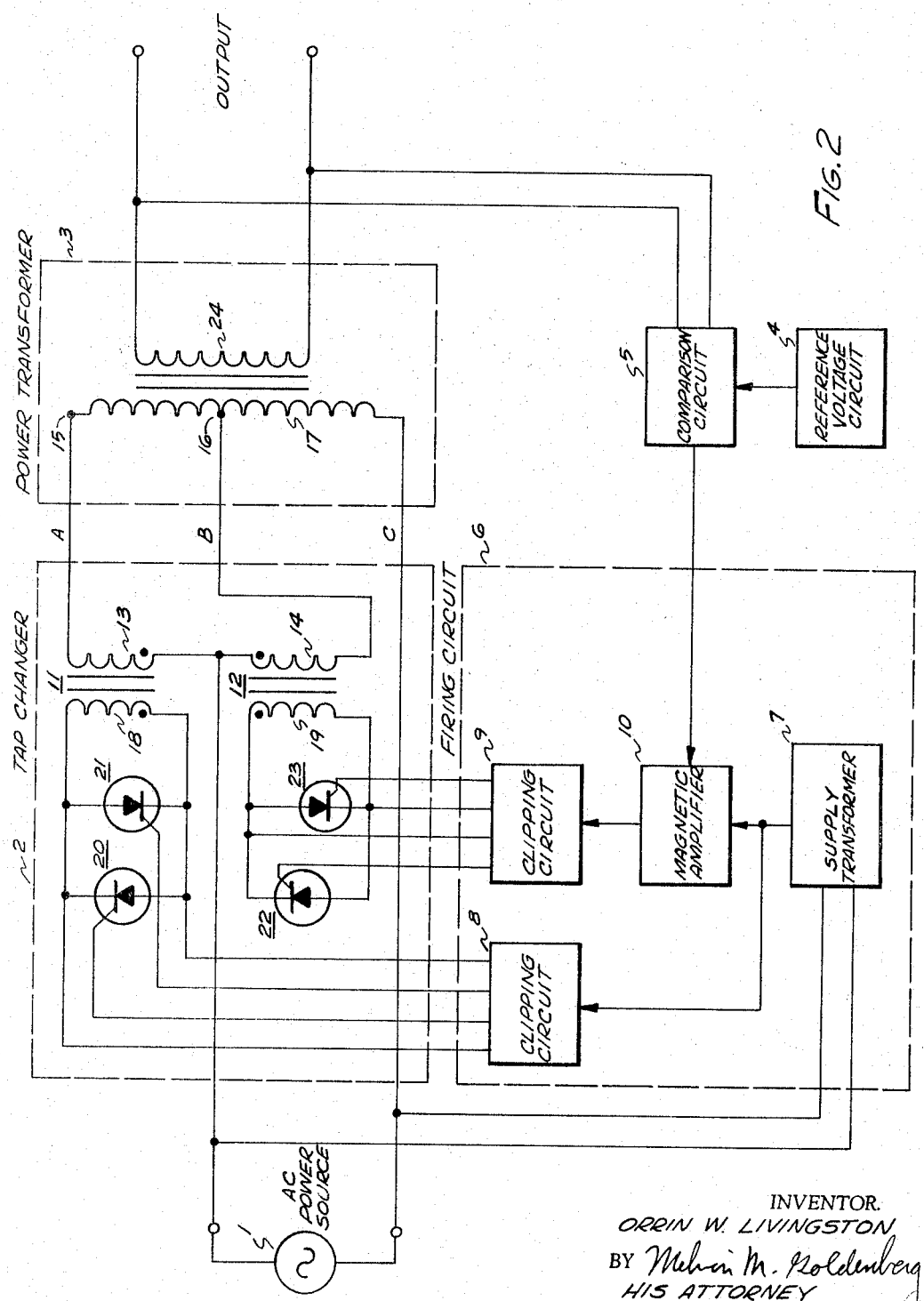

In the drawings, FIGURE 1 is a block diagram of an embodiment of the invention using an automatic voltage control circuit;

FIGURE 2 is a diagram showing an illustrative embodiment of an automatic voltage control circuit constructed in accordance with the principles of the invention; and FIGURE 3 is a graphic representation of the voltage waveforms appearing across the output terminals of the secondary winding of the power transformer of the voltage control circuit shown in FIGURE 2.

Referring now to FIGURE 1, there is shown in block diagram form a voltage regulating system utilizing this invention.

In this system, the voltage from an A.C. power source 1 is applied to a stage 2, as the designated "tap changer," which supplies this voltage to a power transformer 3 through a line C, and either a line A or B, depending upon the phase angle of the source voltage and the magnitude and sense of a signal applied to tap changer 2. Lines A and B are respectively connected to an end point and an intermediate point on one of the windings of power transformer 3.

The aforementioned signal is derived by a feedback circuit which comprises a reference voltage circuit 4 having an output whose value represents a selected output voltage level, a comparison circuit 5, and a firing circuit 6. Comparison circuit 5 senses the output voltage of power transformer 3, compares the value sensed with the reference voltage provided by circuit 4, to produce a deviation or error signal in accordance with the magnitude and polarity of any difference therebetween. This error signal is applied to firing circuit 6 which produces and applies control signals to appropriate switching elements in tap changer 2 at a point in each half cycle, in accordance with the magnitude and sense of the error signal. The actuation of the switching elements in tap changer 2 changes the effective connection of a terminal of source 1 from line A to line B or from line B to line A, to thereby vary the transformer ratio of the windings of transformer 3, and consequently provide controlled regulation of the output voltage.

Referring now to FIGURE 2, wherein there is shown a diagram of an illustrative embodiment of a voltage control circuit constructed in accordance with the invention, an arrangement suitable for use as firing circuit 6 comprises a supply transformer 7 connected across A.C. source 1, clipping circuits 8 and 9, and a magnetic amplifier 10. Magnetic amplifier 10 suitably comprises two gate windings (not shown) connected to the output winding of supply transformer 7 and a control winding (not shown) connected to the output terminal of comparison circuit 5. Clipping circuits 8 and 9 are connected to the output terminals of transformer 7 and magnetic amplifier 10, respectively, thereby limiting the magnitude of the voltage signals applied to the switching elements of tap changer 2.

Tap changer 2 comprises a pair of transformers 11 and 12, comprising primary windings 13 and 14, respectively. One end of each of the primary windings 13 and 14 is connected to a terminal on a supply line while the other end of each primary winding is connected to an end point 15 and an intermediate point 16 respectively on the primary winding 17 of power transformer 3. Across the secondary windings 18 and 19 there are connected pairs of parallel arranged oppositely poled gate controlled rectifiers 20 and 21, and 22 and 23, respectively. The gate electrodes and cathodes of rectifiers 20 and 21 and rectifiers 22 and 23 are connected to the output terminals of clipping circuits 8 and 9, respectively.

In considering the operation of the system of FIGURE 2 reference is also made to FIGURE 3. In such operation, comparison circuit 5, which is shown connected across the output terminals of power transformer secondary winding 24, detects the output voltage waveform appearing thereon. Comparison circuit 5 may suitably include means for rectifying this detected A.C. voltage to provide a D.C. voltage equal to the average value of the detected A.C. voltage. The detected D.C. voltage and a D.C. reference voltage representing the average value of the desired A.C. output voltage and derived from reference voltage circuit 4 are applied to comparison circuit 5 to produce a D.C. error signal proportional to the difference between the two voltages thus compared. Such error signal may suitably be the output of a difference amplifier which may be included in comparison circuit 5 and to which the detected and reference voltages are applied as inputs. Supply transformer 7, connected across the source voltage lines, applies an A.C. voltage at the frequency of the source voltage to the gate windings (not shown) of magnetic amplifier 10 and clipping circuit 8.

Considering the operation during one cycle, assume that the upper line of A.C. voltage source 1 is at the zero crossover point at the beginning of a positive half cycle. At this instant a signal voltage supplied by clipping circuit 8 is applied to the gate electrode of gate controlled rectifier 20 turning it "ON" and thus short circuiting the secondary winding 18. The primary winding 13 of transformer 11 is thus short circuited thereby effectively connecting the upper line of source 1 to point 15 on power transformer primary winding 17. The resultant voltage appearing at the output terminals of secondary winding 24 is the leading portion E of the sinusoidal waveform shown in FIGURE 3. During this period of the cycle, the voltage across primary winding 14 is limited substantially to the voltage between points 15 and 16 and may characteristically be about ten to twenty percent of the source voltage, depending on the range of adjustment of the output voltage required. The terms ratio of transformer 12 may be adjusted so that gate controlled rectifiers 22 and 23 are operating at an optimum voltage level.

At a point angle α in the half cycle, a firing signal is generated by magnetic amplifier 10, clipped by clipping circuit 9, and applied to the gate electrode of gate controlled rectifier 23 turning it "ON," thus short circuiting secondary winding 19 and, hence, primary winding 14. The upper line of source 1 is thereby effectively connected to point 16 on primary winding 17. The change of effective connection of the upper source line from point 15 to point 16 causes point 16 to assume the voltage level just previously occupied by point 15, and because of autotransformer action, the voltage level of point 15 rises above that of point 16. This rise in the voltage level of point 15 causes a voltage substantially equal to the potential difference between points 15 and 16 to appear across primary 13, thus applying a reverse voltage to the cathode to anode path of gate controlled rectifier 20, thereby turning it "OFF."

Now the output voltage at power transformer secondary winding 24 is directly proportional to the transformer ratio, i.e., the ratio of the number of turns on its secondary winding to the number of turns on its primary winding actively engaged in coupling electrical energy from the primary to the secondary winding. It is seen, therefore, that the transformer ratio, and hence, the voltage appearing across secondary winding 24, is increased when the effective connection of the source line is transferred from point 15 to point 16 on primary winding 17. This is so because the effective number of primary winding turns is greater when the source line is connected to point 15 than when it is connected to point 16. This step up in the output voltage caused by the switching action is shown at point P in FIGURE 3. If the output stage rises or falls below the desired value, angle α is respectively less or greater than the angle α corresponding to the desired value of output voltage.

The firing of magnetic amplifier 10 occurs at a point in the half cycle which is determined by the magnitude and sense of the error signal applied to its control winding (not shown). Thus, the output of magnetic amplifier 10 is in synchronism with the output of supply transformer 7 and displaced in phase with respect thereto in accordance with the output of comparison circuit 5. At the end of the positive half cycle, as the A.C. source voltage goes to zero, the current in rectifier 23 will correspondingly go to zero thereby turning rectifier 23 "OFF."

Of course, the same events that occur in the positive half cycle correspondingly occur in the negative half cycle. Thus, at the beginning of the negative half cycle, a firing signal from clipping circuit 8 is applied to the gate electrode of rectifier 21 thereby turning it "ON," causing secondary winding 18, and hence, primary winding 13 to be short circuited. The above switching operation effectively connects the upper line of source 1 to point 15. After a period indicated by the phase angle α, rectifier 22 is turned "ON" by a firing signal generated by magnetic amplifier 10 and applied through clipping circuit 9 to the gate electrode of rectifier 22, effectively connecting the upper line of source 1 to point 16. Due to autotransformer action in winding 17, a voltage substantially equal to the potential difference between points 15 and 16 will appear across primary winding 13, thereby applying a reverse voltage to the anode to cathode path of gate controlled rectifier 21 turning it "OFF." Similarly, at the end of the negative half cycle, rectifier 22 will be turned "OFF." At the beginning of the next positive half cycle, rectifier 20 will again be turned "ON," as previously explained.

The effect of the phase controlled switching operations described above is to effect a change in the transformer ratio of the power transformer and hence in the output voltage at the power transformer secondary at a point in the half cycle in accordance with the deviation of the output voltage from a desired value, thereby achieving automatic control over the output voltage with a very small expenditure of power as compared to the total power output.

The point in the half cycle at which the transition from one position to another position on one of the windings of the power transformer takes place, may suitably be adjusted to produce a desired characteristic such as substantially constant output voltage in a voltage power supply system.

While the invention has been described by reference to a particular embodiment thereof, it will be understood that numerous modifications may be made by those skilled in the art without departing from the invention and it is, therefore, aimed in the appended claims to cover all such equivalent variations as fall within the true spirit and scope of the invention.

What is claimed as new and desired to be secured by Letters Patent of the United States is:

1. Apparatus for providing a regulated potential supply from an A.C. power source comprising, a first transformer comprising a first secondary winding and a first primary winding having an end connected to a terminal of said source, a second transformer comprising a second secondary winding and a second primary winding connected between a second terminal of said source and an end point of said first primary winding, a third transformer comprising a third secondary winding and a third primary winding connected between said second terminal and an intermediate point on said first primary winding, means in circuit with said second and third secondary windings and responsive to the application thereto of a voltage representing a deviation of the output voltage appearing across said first secondary winding from a selected value for effectively connecting said second terminal to one of said first primary winding points at the beginning of each half cycle of output voltage and switching said connection to the other of said primary winding points at a point in said half cycle in accordance with said deviation.

2. The apparatus as defined in claim 1 wherein there is included a reference voltage source which represents said selected output voltage and comparison means in circuit with said reference voltage source and said first secondary winding for comparing said reference and output voltage to derive a difference voltage therebetween, said difference voltage representing said deviation.

3. The apparatus as defined in claim 1 wherein said connecting means comprises switching means in circuit with said second and third secondary windings, said switching means comprising first and second pairs of oppositely poled switching elements in parallel arrangement connected across said second and third secondary windings, respectively.

4. The apparatus as defined in claim 3 including firing circuit means in circuit with said comparison means and said switching means for triggering said first pair at said beginning of said half cycle and for triggering said control pair at said point in said half cycle.

5. The apparatus as defined in claim 4 wherein said firing circuit means comprises, a magnetic amplifier to which the output of said comparison means is applied, a first clipping circuit interconnecting the output of said magnetic amplifier with said first pair of switching elements, a second clipping circuit, and a supply transformer supplied by said A.C. source, the output of said supply transformer being connected via said second clipping circuit to the said second pair of switching elements.

6. The apparatus as defined in claim 3 wherein said switching elements are gate controlled rectifiers.

References Cited by the Examiner
UNITED STATES PATENTS

| | | | |
|---|---|---|---|
| 2,959,726 | 11/1960 | Jensen | 323—25 X |
| 3,040,239 | 6/1962 | Walker | 323—43.5 X |
| 3,263,157 | 7/1966 | Klein | 323—24 X |
| 3,275,929 | 9/1966 | Schatz | 323—43.5 X |
| 3,281,652 | 10/1966 | Derrins | 323—47 X |

JOHN F. COUCH, *Primary Examiner.*

A. D. PELLINEN, *Assistant Examiner.*